(12) United States Patent
Sasa et al.

(10) Patent No.: US 6,655,498 B1
(45) Date of Patent: Dec. 2, 2003

(54) PIPE COUPLING AND DRAIN PLUG FOR ENGINE OIL CHANGE

(75) Inventors: Takeya Sasa, Tokyo (JP); Yoshikazu Ozaki, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 43 days.

(21) Appl. No.: 09/670,841

(22) Filed: Sep. 27, 2000

(30) Foreign Application Priority Data

Sep. 29, 1999 (JP) .......................................... 11-277337

(51) Int. Cl.[7] .............................................. F16N 31/00
(52) U.S. Cl. .................... 184/1.5; 184/105.3; 184/75; 137/614.04
(58) Field of Search ............................ 184/1.5, 75, 80, 184/82, 105.3; 137/614.04; 123/196 A, 196 R, 196 S

(56) References Cited

U.S. PATENT DOCUMENTS

| | | | | | |
|---|---|---|---|---|---|
| 1,659,047 A | * | 2/1928 | Quinn | ......................... | 184/1.5 |
| 2,075,024 A | * | 3/1937 | Delano | ......................... | 184/1.5 |
| 2,451,218 A | * | 10/1948 | Hengst | ..................... | 137/614.04 |
| 2,504,569 A | * | 4/1950 | Murphy et al. | .............. | 137/596 |
| 2,931,668 A | * | 4/1960 | Baley | ..................... | 137/614.04 |
| 3,336,944 A | * | 8/1967 | Anderson et al. | ....... | 137/614.04 |
| 4,543,994 A | * | 10/1985 | Johnson et al. | ......... | 137/614.04 |
| 4,745,894 A | | 5/1988 | Laipply et al. | .............. | 123/196 |
| 5,048,578 A | | 9/1991 | Dorf et al. | ................... | 141/346 |
| 5,546,979 A | * | 8/1996 | Clark et al. | .............. | 123/196 A |
| 5,667,195 A | * | 9/1997 | McCormick | ................ | 184/1.5 |
| 6,095,190 A | * | 8/2000 | Wilcox et al. | .......... | 137/614.04 |
| 6,135,150 A | * | 10/2000 | Powell et al. | ........... | 137/614.04 |
| 6,148,858 A | * | 11/2000 | Kirkman | ................. | 137/614.04 |
| 6,161,578 A | * | 12/2000 | Braun et al. | ............ | 137/614.04 |
| 6,170,522 B1 | * | 1/2001 | Tanida | .................... | 137/614.04 |
| 6,199,578 B1 | * | 3/2001 | Clark, II | ................. | 123/196 A |
| 6,206,344 B1 | | 3/2001 | Takahara | ................. | 251/149.6 |
| 6,234,274 B1 | * | 5/2001 | van der Griendt | ...... | 123/196 R |

FOREIGN PATENT DOCUMENTS

| | | |
|---|---|---|
| JP | 63-196893 | 12/1988 |
| JP | 4-48987 | 8/1992 |
| JP | 6-19909 | 6/1994 |
| JP | 7-12694 | 3/1995 |
| JP | 11-107733 | 4/1999 |
| JP | 11-294135 | 10/1999 |

* cited by examiner

Primary Examiner—Chong H. Kim

(57) ABSTRACT

This invention provides a pipe coupling used for changing oil in an engine oil pan with an oil drain port. A drain plug has a drain plug main body having one end to be attached to the oil drain port of the engine oil pan, a recess formed in its outer surface of the other end projecting outward from the oil pan, and an axial oil flow path extending in an axial direction, a valve holder to be arranged in the plug main body, and a valve body held by the valve holder and capable of closing the flow path. A socket connectable to the drain plug has a socket main body to be mounted on the drain plug, a seal member for engaging with the valve holder in a fluid tight manner when the socket main body is mounted on the other end of the drain plug, a plurality of locking members which can engage with the plug main body when one end of the socket main body is mounted on the other end of the drain plug, and a slide sleeve mounted on the outer surface of the socket main body and capable of holding the locking member in an engaging state. The valve body opens the oil flow path when one end of the socket main body is mounted on the other end of the drain plug.

9 Claims, 2 Drawing Sheets

PIPE COUPLING AND DRAIN PLUG FOR ENGINE OIL CHANGE

CROSS-REFERENCE TO RELATED APPLICATIONS

This application is based upon and claims the benefit of priority from the prior Japanese Patent Application No. 11-277337, filed Sep. 29, 1999, the entire contents of which are incorporated herein by reference.

BACKGROUND OF THE INVENTION

The present invention relates to a pipe coupling for engine oil change which is comprised of a drain plug to be attached to and detached from the oil drain port of an engine oil pan and a socket detachably attached to the drain plug and, to a drain plug for engine oil change with which, when the engine oil is changed, it can be drained easily without removing the drain plug.

Conventionally, an engine uses engine oil to cool or lubricate components in the engine. When the engine oil deteriorates, it is drained the outside the engine through a drain plug provided to an engine oil pan, so that the old engine oil can be changed for new engine oil. When it is time to change engine oil, the drain plug must be removed and the engine oil must be drained at an auto repair shop or the like.

This engine oil change takes time since the drain plug attached to the engine oil pan must be removed, the oil must be drained, and after that the drain plug must be attached to the engine oil pan again. During the change, the oil may be spilled to soil the repair shop. If the engine oil is changed often, the screw of the drain plug may be worn or damaged to cause oil leakage from this portion.

BRIEF SUMMARY OF THE INVENTION

It is, therefore, an object of the present invention to provide a pipe coupling for oil change in which a flow path is formed in a drain plug, a valve is provided to the flow path, and when a mating socket is connected to the drain plug, the valve opens the flow path to allow the oil in the oil pan to be drawn, so that conventional drain plug attaching/detaching operation is eliminated and efficiency in engine oil change is improved. It is another object of the present invention to provide a pipe coupling for oil change in which, since a plug constituting the pipe coupling is a drain plug to be attached to an engine oil pan, the projecting amount of the plug from the engine oil pan can be made as small as possible, when a stone or the like hits the drain plug, the drain plug will not be damaged easily, and a valve in the drain plug will not be manually opened easily.

According to one aspect of the present invention, there is provided a pipe coupling used for changing oil in an engine oil pan with an oil drain port. This pipe coupling comprises a drain plug to be attached to the oil pan, the drain plug having a drain plug main body with one end to be attached to the oil drain port of the engine oil pan, the other end projecting outward from the oil pan, a recess formed on an outer surface of the other end, and an axial hole capable of communicating with an interior of the oil pan and forming an oil flow path, a valve holder arranged, in the axial hole, at a front position of the other end, and having an end face facing outward, and a valve body held by the valve holder and capable of closing the flow path. This pipe coupling also comprises a socket which can be connected to the drain plug. The socket has a socket main body with one end that can be mounted on the other end of the drain plug, and an axial hole capable of communicating with the axial hole in the plug main body and forming an oil flow path, a seal member arranged in the axial hole of the socket main body to engage with the end face of the valve holder when one end of the socket main body is mounted on the other end of the drain plug, a plurality of locking members provided to the socket main body and capable of engaging with the recess when one end of the socket main body is mounted on the other end of the drain plug, and a slide sleeve mounted on an outer surface of the socket main body to be movable in an axial direction and capable of holding a state wherein the locking member engages in the recess. The valve body opens the oil flow path when one end of the socket main body is mounted on the other end of the drain plug.

According to the pipe coupling according to the present invention, when the socket is connected to the drain plug, the valve body provided in the drain plug opens the oil flow path. Thus, oil can be drawn into the engine oil pan. Thus, the conventional drain plug mounting/attaching operation is not necessary, the labor needed for engine oil change can be decreased, and the operation time can be shortened.

The valve holder is preferably a member separate from the drain plug main body, and is further preferably fixed to the drain plug main body by caulking. In this case, the outward projecting amount of the drain plug from the engine oil pan can be reduced.

If the valve body has an end face to be arranged on an axially inner side than the end face of the valve holder, damage to the valve body, which may occur when a stone or the like collides against the drain plug, can be prevented.

According to an another aspect of the present invention, there is provided a drain plug for a pipe coupling designed to change oil in an engine oil pan that has a drain port. The drain plug comprises a main body having a first end part to be attached to the drain port of the oil pan, a second end part projecting outwards from the oil pan, a recess made in an outer surface of the second end part, and an axial hole forming an oil path and capable of communicating with an interior of the oil pan; a valve holder provided in the axial hole, positioned near the second end part and having a face exposed to outside; and a valve body held in the valve holder, for closing the oil path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
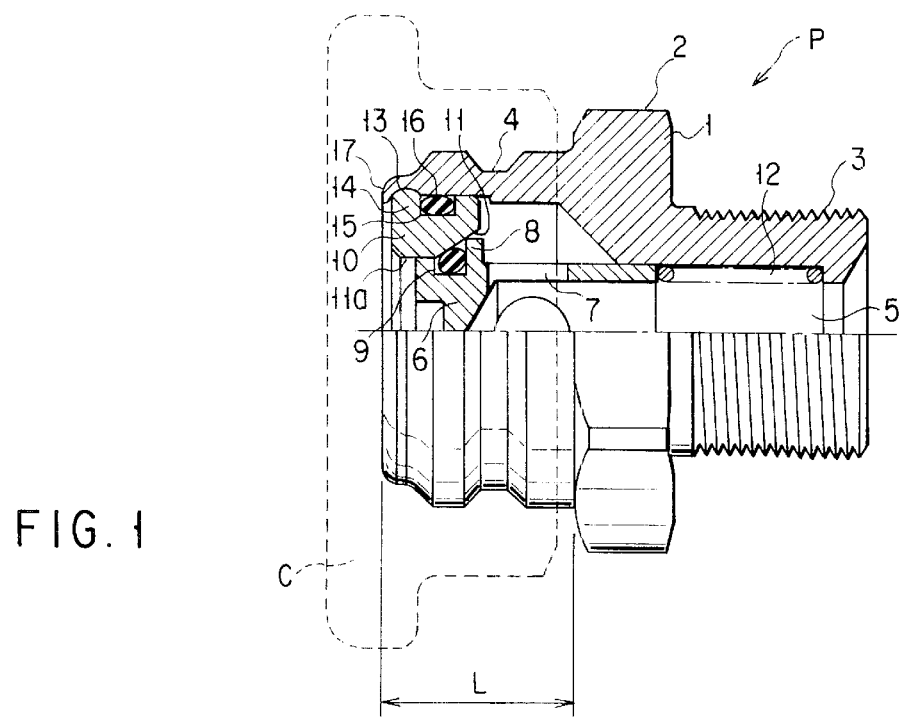
FIG. 1 is a half sectional view of a drain plug that forms a pipe coupling for oil change according to a preferable embodiment of the present invention.
Figure 2:
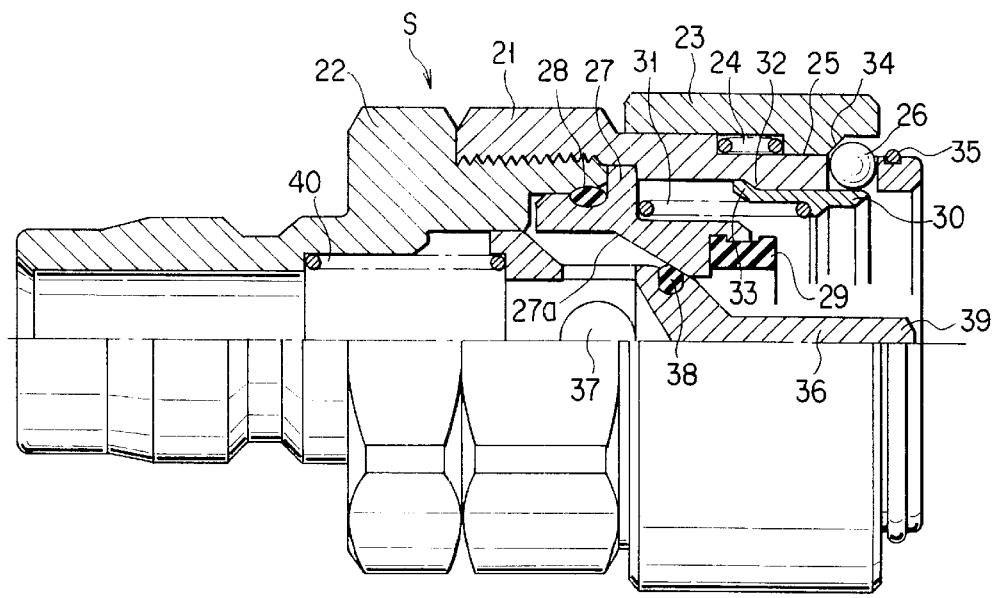
FIG. 2 is a half sectional view of a socket to be combined with the drain plug shown in FIG. 1.
Figure 3:
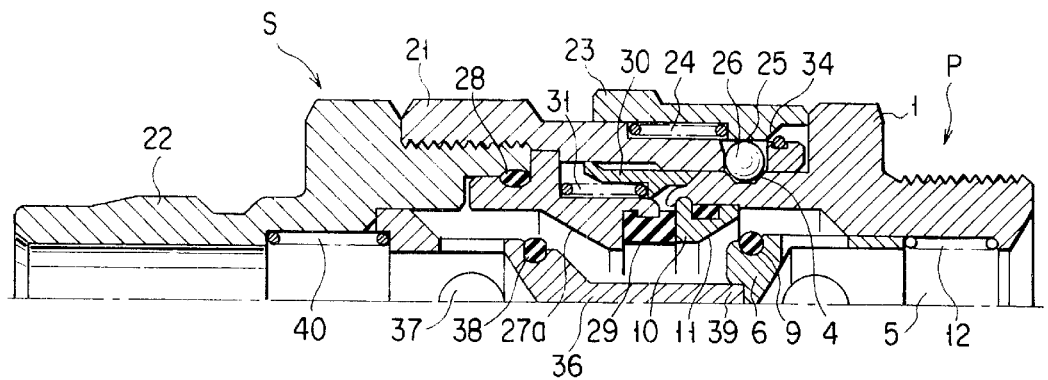
FIG. 3 is a half sectional view of a state wherein the drain plug and socket respectively shown in FIGS. 1 and 2 are connected.

FIGS. 1 to 3 show a pipe coupling for engine oil change according to the first embodiment of the present invention. This pipe coupling has a drain plug P to be attached to an engine oil pan and a socket S.

The arrangement of the drain plug P will be described with reference to FIG. 1.

Referring to FIG. 1, reference numeral 1 denotes a drain plug main body. A hexagonal engaging portion 2, which can engage with a tool (spanner or the like) that threadably engages the drain plug P with a threaded portion formed in the hole of an engine oil pan, is formed on the outer surface of the central portion of the drain plug main body 1. A screw 3 is formed on the right outer surface in FIG. 1 of the engaging portion 2 to threadably engage with the engine oil pan. An engaging recess 4 extending in, e.g., the circumferential direction, is formed on the left outer portion in FIG. 1 of the engaging portion 2 to lock the locking member (ball) of the socket S which is to be connected to the drain plug P. In FIG. 1, a cap C is to be placed on the drain plug P.

A flow path 5 is formed at the center of the internal portion of the drain plug main body 1, and a valve body 6 for closing the flow path 5 is slidably arranged in the flow path 5. The valve body 6 has a cylindrical shape. Oil communication holes 7 are formed in the outer surface of the cylindrical shape of the valve body 6 at an appropriate interval in the circumferential direction. A seating surface 8 is formed on the left end in FIG. 1 of the cylindrical shape to abut against an inclined surface 11 of a valve holder 10 (to be described later) mounted on the main body 1. A seal member 9 is arranged on the seating surface 8. The seal member 9 is pushed against the inclined surface 11 and an inner surface 11a of the valve holder 10 (to be described later), thereby closing the flow path 5.

The valve body 6 is pushed by the biasing force of a spring 12 arranged between itself and drain plug main body 1 against the inclined surface 11 of the valve holder 10. In the assembled drain plug P, the valve body 6 is located at some distance from the end face of the valve holder 10, the end face of the valve body 6 abuts against the inclined surface 11 of the valve holder 10. More specifically, the left end face in FIG. 1 of the valve body 6 is positioned in the valve holder 10 at a distance from the left end face of the valve holder 10. Thus, when a stone or the like hits the drain plug P, it will not push the valve body 6 upward through the cap C so oil leakage will not occur, and the valve body 6 will not be easily pushed into the valve holder 10 by a hand or the like during the operation.

The valve holder 10 is formed separately from the drain plug main body 1. A projection 14 to fit in a recess 13 formed in the inner surface of the drain plug main body 1, and an annular groove 15 for receiving a seal member 16 are formed in the outer surface of the valve holder 10. With the projection 14 being fitted in the recess 13 of the drain plug main body 1, when an end 17 of the drain plug main body 1 is caulked, the valve holder 10 is fixed to the drain plug main body 1. At this time, since the projection 14 is fitted in the recess 13 of the drain plug main body 1, when the end 17 is caulked, the valve holder 10 is prohibited from moving, and the seal member 16 assures the tight seal between the valve holder 10 and drain plug main body 1. In this manner, since the valve holder 10 is formed separately from the drain plug main body 1 and the end 17 of the drain plug main body 1 is caulked to the side end of the connected socket S, a projecting amount L from the engaging portion 2 can be reduced. Thus, when this drain plug P is mounted to the engine oil pan, the projecting amount of the drain plug P to the road surface can be decreased.

Normally, the cap C is placed on the drain plug P to protect the valve body 6.

When the drain plug P with the above arrangement is connected to the socket S (to be described later), it is pushed by the abutting surface of the end of the rear cylinder (to be described later) of the socket S to move to the right in FIG. 1 while deflecting the spring 12, thereby opening the flow path 5 for oil.

The arrangement of the socket S to be connected to the drain plug P will be described. FIG. 2 is a half sectional view of the socket S.

Referring to FIG. 2, the socket S is comprised of a front cylinder 21 and rear cylinder 22. A sleeve 23 is slidably fitted on the outer surface of the front cylinder 21, and a sleeve spring 24 for biasing the sleeve 23 to the right in FIG. 2 is arranged between the front cylinder 21 and sleeve 23. With the biasing force of the sleeve spring 24, the sleeve 23 can prohibit a ball 26, serving as a locking member for locking the drain plug P described above by the operation of a step 25 formed on the inner surface of the sleeve 23, from being moved in the radially outward direction.

The rear cylinder 22 in which a valve (to be described later) is to be mounted is fitted on the left-end (FIG. 2) inner surface of the front cylinder 21 by screwing, and a valve seat body 27 is sandwiched and fixed between the front and rear cylinders 21 and 22. A seal member 28 is provided between the valve seat body 27 and rear cylinder 22. A seal member 29 which abuts against the seating surface of the valve holder 10 of the drain plug P is held at the right end (in FIG. 2) of the valve seat body 27 to project to the right in FIG. 2 from the end face of the valve seat body 27. A collar 30 is slidably provided on the inner surface of the front cylinder 21, and a coil spring 31 for biasing the collar 30 to the right in FIG. 2 is provided between the valve seat body 27 and collar 30. A projection 33 formed on the outer surface of the collar 30 abuts against a projection 32 formed on the inner surface of the front cylinder 21, so that the collar 30 is prevented from dropping from the front cylinder 21. When the drain plug P is not connected to the socket S, the collar 30 serves to prohibit the ball 26 from moving in the radially inward direction. An inclined surface 34 formed on the step 25 of the sleeve 23 abuts against the ball 26 which is moved in the radially outward direction by the collar 30, to prohibit the sleeve 23 from moving forward. Reference numeral 35 in FIG. 2 denotes a stop ring to limit the forward movement of the sleeve 23.

A valve body 36 is slidably held at the front end of the inner surface of the rear cylinder 22 fixed to the front cylinder 21. The left half in FIG. 2 of the valve body 36 is formed cylindrical. Oil communication holes 37 are formed in the outer surface of the left half of the valve body 36 at an appropriate interval from each other. A seal member 38 for abutting against an inclined surface 27a formed on the valve seat body 27 is held on the outer surface of the intermediate portion in FIG. 2 of the valve body 36. A press portion 39 which can push the valve body 6 of the drain plug P is formed on the right end in FIG. 2 of the valve body 36. The valve body 36 is biased to the right in FIG. 2 by a valve spring 40 arranged between the valve body 36 and rear cylinder 22. Hence, the seal member 38 is pushed by the inclined surface 27a of the valve seat body 27 to close the flow path 5. A plug, which is connectable to an another socket, is formed on the outer end of the rear cylinder 22.

The connecting operation of the drain plug P and socket S with the above arrangement will be described.

The drain plug P threadably engages with the engine oil pan to be fixed to it. In this state, the valve body 6 in the drain plug P closes the flow path 5. The cap C is mounted to the drain plug P to protect the valve body 6.

To change oil, the cap C of the drain plug P is removed and the socket S is connected to the drain plug P (see FIG. 3). Then, the flow paths in the drain plug P and socket S are opened in the following manner so that the oil in the engine can be drawn.

More specifically, referring to FIG. 3, as the drain plug P is pushed into the socket S, the collar 30 of the socket S moves to the left in FIG. 3 against the biasing force of the coil spring 31. When the drain plug main body 1 is further pushed into the socket S, the ball 26, which is pushed radially inward by the inclined surface 34 of the sleeve 23 biased by the sleeve spring 24, is fitted in the engaging recess 4 formed in the drain plug main body 1. The sleeve 23 moves toward the drain plug P, and the radially outward movement of the ball 26 is prohibited by the step 25 of the sleeve 23, so that the sleeve 23 and drain plug P are connected to each other. In this state, the seal member 29 in the socket S abuts against the end face of the valve holder 10 in the drain plug P to seal the flow path 5 from the surrounding environment. The valve body 36 in the socket S and the valve body 6 in the drain plug P abut against each other to deflect the corresponding valve springs 40 and 12. Thus, the seal members 38 and 9 respectively separate from the inclined surfaces 27a and 11, and the flow paths in the drain plug P and socket S communicate with each other. As a result, the oil in the engine oil pan is drained outside the engine through the drain plug P and socket S.

After the engine oil is drained, the sleeve 23 is moved to the left in FIG. 3 against the biasing force of the sleeve spring 24. Then, the prohibiting force against the radially outward movement of the ball 26 disappears, and the socket S can be detached from the drain plug P, so that the socket S and drain plug P can be separated from each other. When the socket S is detached, the valve body 6 in the drain plug P returns to the initial state wherein it closes the flow path 5 with the biasing force of the spring 12. Oil can then be stored in the engine again.

Figure 4:
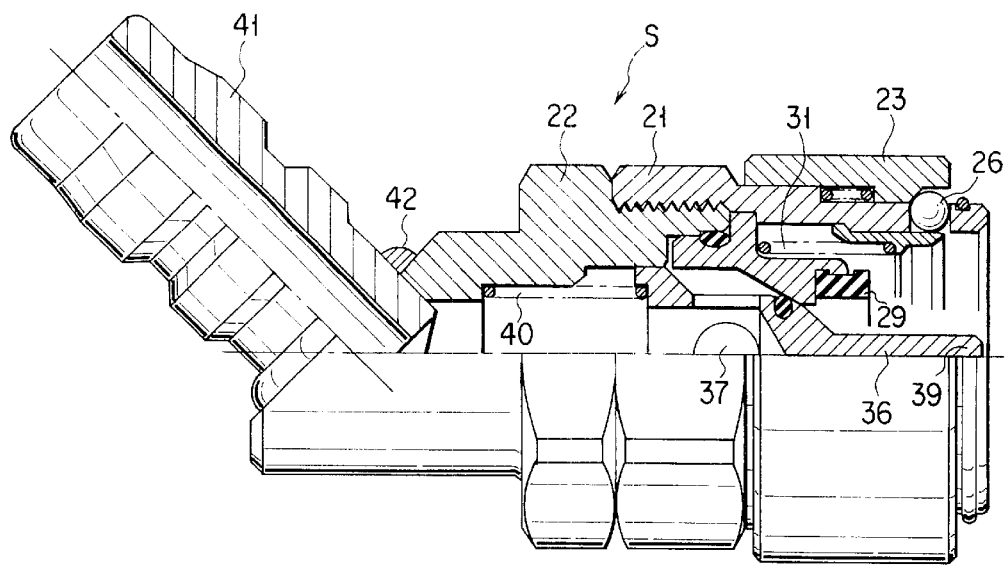
FIG. 4 is a half sectional view of a socket that forms a pipe coupling for oil change according to the second embodiment of the present invention.

A socket according to the second embodiment will be described with reference to FIG. 4. The characteristic feature of the second embodiment resides in that a fluid pipe 41 is inclined and connected to a rear cylinder 22 of the socket S by welding 42. Although the fluid pipe 41 and the rear cylinder 22 are fixed to each other by welding 42, if necessary, the fluid pipe 41 may be bent freely with respect to the rear cylinder 22 by using a universal joint or the like. Except for this, the arrangement of the second embodiment is the same as that of the first embodiment. A plug, which is connectable to an another socket, is formed on the fluid pipe 41.

Although the front and rear cylinders are constituted by separate members and are fixed to each other by screw connection in the above socket S, they may be integrally formed with each other. In the above embodiments, the valve holder in the drain plug is fixed to the drain plug main body by caulking. Alternatively, the fixing means is not limited to caulking, and the valve holder may be fixed to the drain plug main body by other appropriate fixing means such as welding, adhesion, screws, and the like.

In the pipe coupling for engine oil change according to the preferable embodiments described above in detail, the flow path 5 is formed in the drain plug P, and a valve is provided in the flow path 5. When the connectable socket S is connected to the drain plug P, the valve opens the flow path 5. Hence, oil in the oil pan can be drawn. The conventional drain plug attaching/detaching operation becomes unnecessary, and the efficiency of change of the engine oil can be improved. Since the drain plug P is comprised of separate drain plug main body 1 and valve holder 10 and the drain plug main body 1 and valve holder 10 are fixed to each other by a fixing means such as caulking, the projecting amount of the drain plug P from the engine oil pan can be decreased. The valve body 6 is arranged in the drain plug P to be located on the inner side from the end face of the valve holder 10, so that good effects can be obtained, e.g., when a stone or the like hits the drain plug P, the valve will not be damaged easily.

The present invention has been described by way of preferable embodiments shown in the accompanying drawings. It is apparent that other similar embodiments may be used, the above embodiments may be modified, or other embodiments may be added in order to obtain the same function as that of the present invention without departing from the present invention. Therefore, the present invention should not be limited to either single embodiment but be construed in accordance with the spirit and scope of the invention as defined in the appended claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drain plug for a pipe coupling designed to change oil in an engine oil pan that has a drain port, said drain plug comprising:

a main body having a first end part to be attached to the drain port of the oil pan, a second end part projecting outwards from the oil pan, a recess made in an outer surface of the second end part, and an axial hole forming an oil path and capable of communicating with an interior of the oil pan, a valve holder fixed in the axial hole, positioned near the second end part and having an end face exposed to outside and an inclined surface positioned on an axially opposite side to said end face;

a valve body urged against and supported by the inclined surface in the valve holder, for closing the oil path; and a seal member which is fitted to an inclined surface of the valve holder or the valve body and which seals a space between the inclined surface of the valve holder and the valve body, wherein the main body holds the valve holder at a position at which the end face does not project beyond the second end part and the valve holder holds the valve body at a position at which the valve body does not project beyond the end face, thereby preventing the valve body from being lifted easily from the inclined surface when hit by a stone or the like.

2. The drain plug according to claim 1, wherein said valve holder is fixed to said drain plug main body by caulking.

3. The drain plug according to claim 1, wherein said valve body has at least one oil communication hole.

4. A pipe coupling used for changing oil in an engine pan with an oil drain port, comprising:

a drain plug to be attached to said oil pan, said drain plug having a drain plug main body with one end to be attached to said oil drain port of said engine pan, the other end projecting outward from said oil pan, a recess formed in an outer surface of said other end, and an axial hole capable of communicating with an interior of said oil pan and forming an oil flow path, a valve holder fixed, in said axial hole, at a front position of said other end, and having an end face facing outward and an inclined surface positioned on an axially opposite side to said end face, a valve body urged against and supported by the inclined surface and capable of closing said flow path, and a first seal member which is fitted to an inclined surface of the valve holder or the valve body and which seals a space between an inclined surface of the valve holder and the valve body wherein said drain plug main body holds the valve holder at a position at which the end face does not project beyond said other end and the valve holder holds the valve body at a position at which the valve body does not project beyond the end face, thereby preventing the valve body from being separated from the inclined surface when hit by a stone or the like, said pipe coupling further comprising a socket which can be connected to said drain plug, said socket having a socket main body with one end that can be mounted on said other end of said drain plug, and an axial hole capable of communicating with said axial hole in said plug main body and forming an oil flow path, a second seal member arranged in said axial hole of said socket main body to engage with said end face of said valve holder in a fluid tight manner when one end of said socket main body is mounted on said other end of said drain plug, a plurality of locking members provided to said socket main body and capable of engaging with said recess when said one end of said socket main body is mounted on said other end of said drain plug, and a sleeve mounted on an outer surface of said socket main body to be movable in an axial direction, and capable of holding a state wherein said locking member engages in said recess, wherein said valve body opens said oil flow path when one end of said socket main body is mounted on said other end of said drain plug.

5. The coupling according to claim 4, wherein said socket has a valve seat body to be fixed to said socket main body, said valve seat body having a distal end insertable in said axial hole of said drain plug main body, said first seal member is provided to said distal end of said valve seat body, and an end face of said first seal member which abuts against said end face of said valve holder projects on a side of said one end of said socket main body more than said distal end of said valve seat body.

6. The coupling according to claim 4, wherein said socket has a valve body movably arranged in said axial hole, and when said valve body is biased toward said one end to engage with a valve seat body in a fluid tight manner, to close said oil flow path, and to be connected to said drain plug, said valve body pushes said valve body of said drain plug into said plug main body, and is pushed by said valve body to separate from said valve seat body, so that oil flow paths of said socket and drain plug communicate with each other.

7. The coupling according to claim 4, wherein said socket is arranged in said axial hole in said socket main body, and has a collar for prohibiting said locking members from moving into said axial hole when said socket is not connected to said drain plug, said collar being moved inward in an axial direction by said one end of said plug main body when said socket is to be connected to said drain plug.

8. The coupling according to claim 6, wherein said valve body of said plug has at least one oil communication hole.

9. The coupling according to claim 4, wherein said socket has a fluid pipe which is to be connected to the other end of said socket main body, said fluid pipe having an axis inclined with respect to an axis of said socket main body.

\* \* \* \* \*